May 3, 1932. W. N. BOOTH 1,856,236
MEANS FOR SECURING WHEEL BODIES TO WHEEL HUBS
Filed Jan. 24, 1927 3 Sheets-Sheet 1

Inventor
William N. Booth.

May 3, 1932. W. N. BOOTH 1,856,236
MEANS FOR SECURING WHEEL BODIES TO WHEEL HUBS
Filed Jan. 24, 1927 3 Sheets-Sheet 2
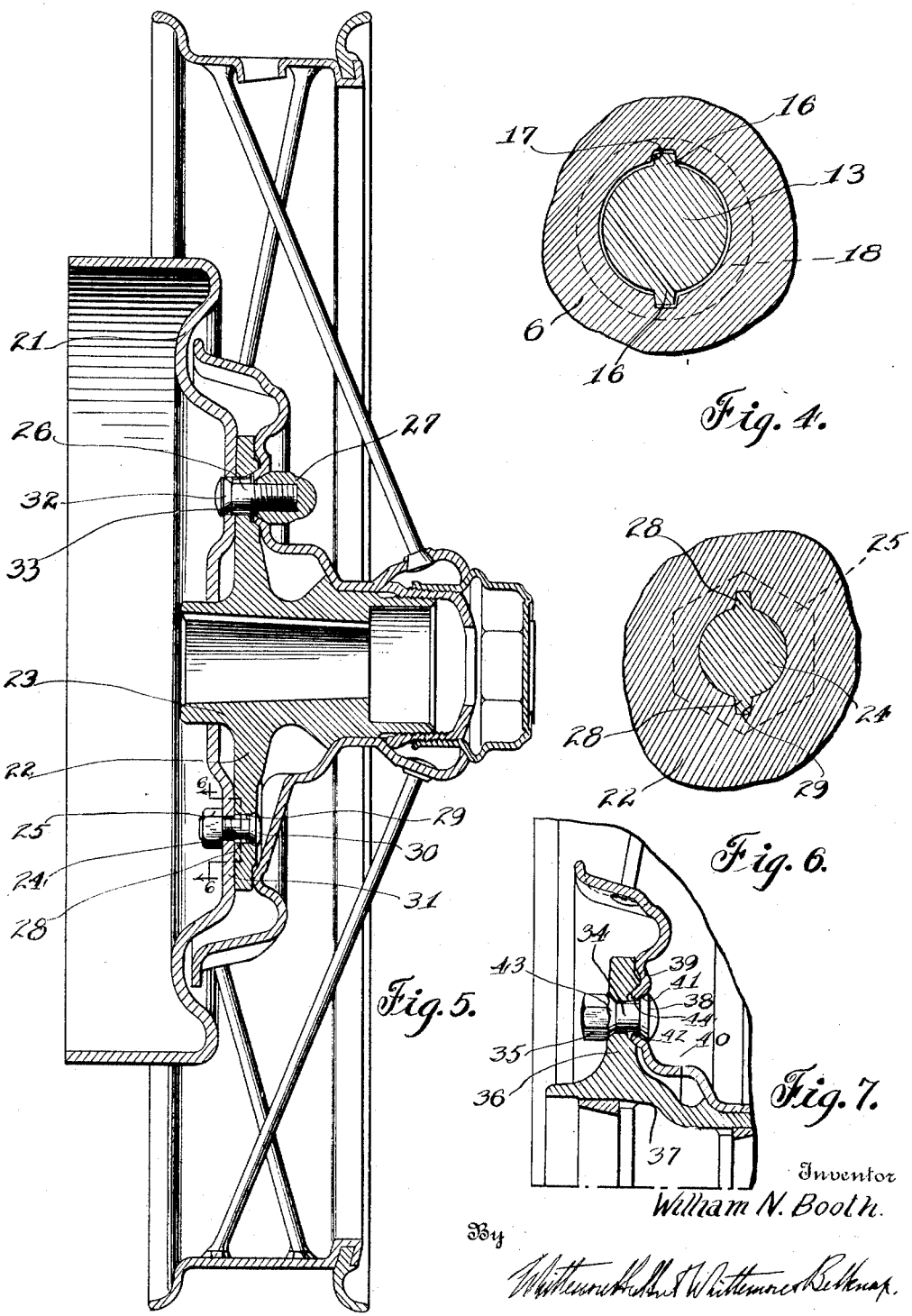
Inventor
William N. Booth.
By
Attorneys May 3, 1932.    W. N. BOOTH    1,856,236
MEANS FOR SECURING WHEEL BODIES TO WHEEL HUBS
Filed Jan. 24, 1927    3 Sheets-Sheet 3
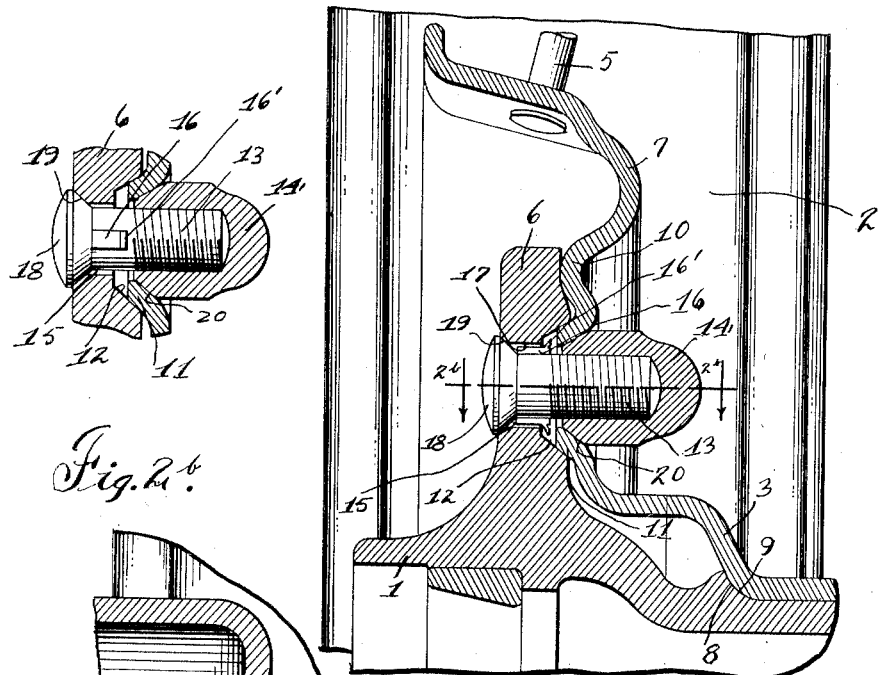
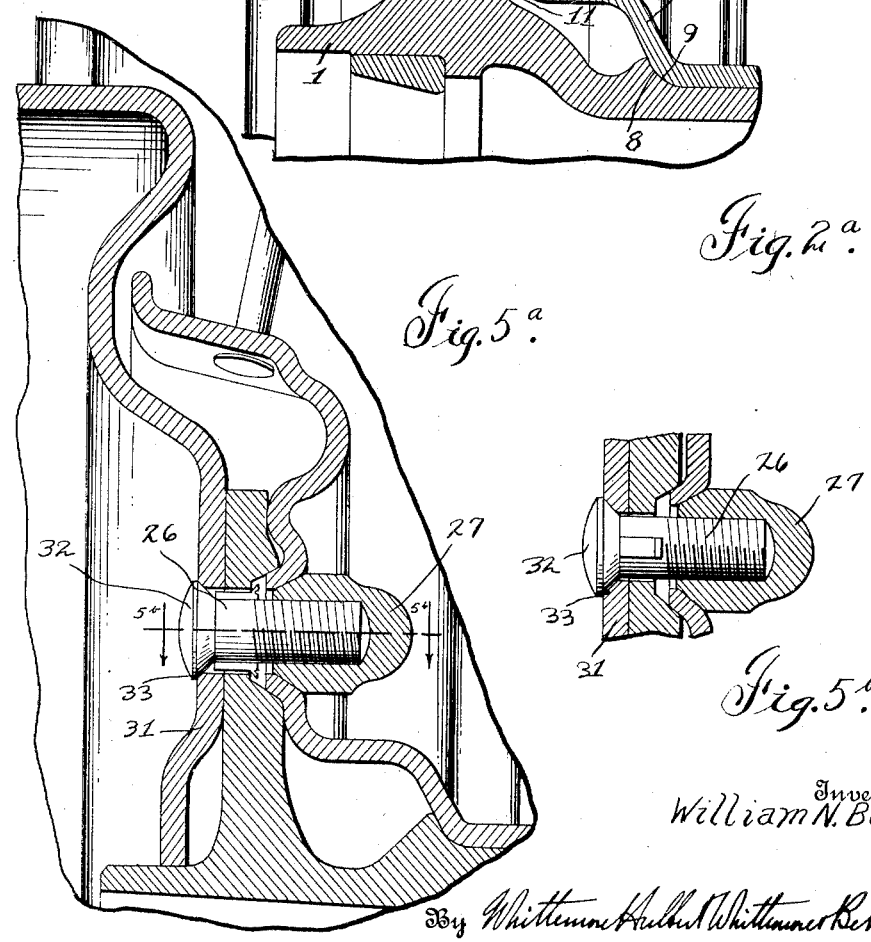
Inventor
William N. Booth
Attorneys Patented May 3, 1932

1,856,236

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

MEANS FOR SECURING WHEEL BODIES TO WHEEL HUBS

Application filed January 24, 1927. Serial No. 163,288.

The invention relates to vehicle wheels and refers more particularly to the means for securing wheel bodies to wheel hubs. One of the objects of the invention is to provide an improved securing means having a securing member which is held from rotation but is free to move angularly while the wheel body is being secured to the wheel hub. Another object is to provide means other than the securing means for driving the wheel body from the wheel hub and constructed to lock the securing means from disengagement. Further objects of the invention reside in the novel features of construction and combinations and arrangements of parts as more fully hereinafter set forth.

In the drawings:—

Figure 1 is a side elevation of a portion of a vehicle wheel embodying my invention;

Figures 2 and 3 are cross sections respectively on the lines 2—2 and 3—3 of Figure 1; Figure 2$^a$ is an enlarged view of a portion of Figure 2; Figure 2$^b$ is a cross section on the line 2$^b$—2$^b$ of Figure 2$^a$;

Figure 4 is a cross section on the line 4—4 of Figure 2;

Figure 5 is a view similar to Figure 2 and showing a modified construction; Figure 5$^a$ is an enlarged view of a portion of Figure 5; Figure 5$^b$ is a cross section on the line 5$^b$—5$^b$ of Figure 5$^a$;

Figure 6 is an enlarged cross section on the line 6—6 of Figure 5;

Figure 7 is a view similar to Figure 2 and showing another modified construction.

Figures 2, 3:
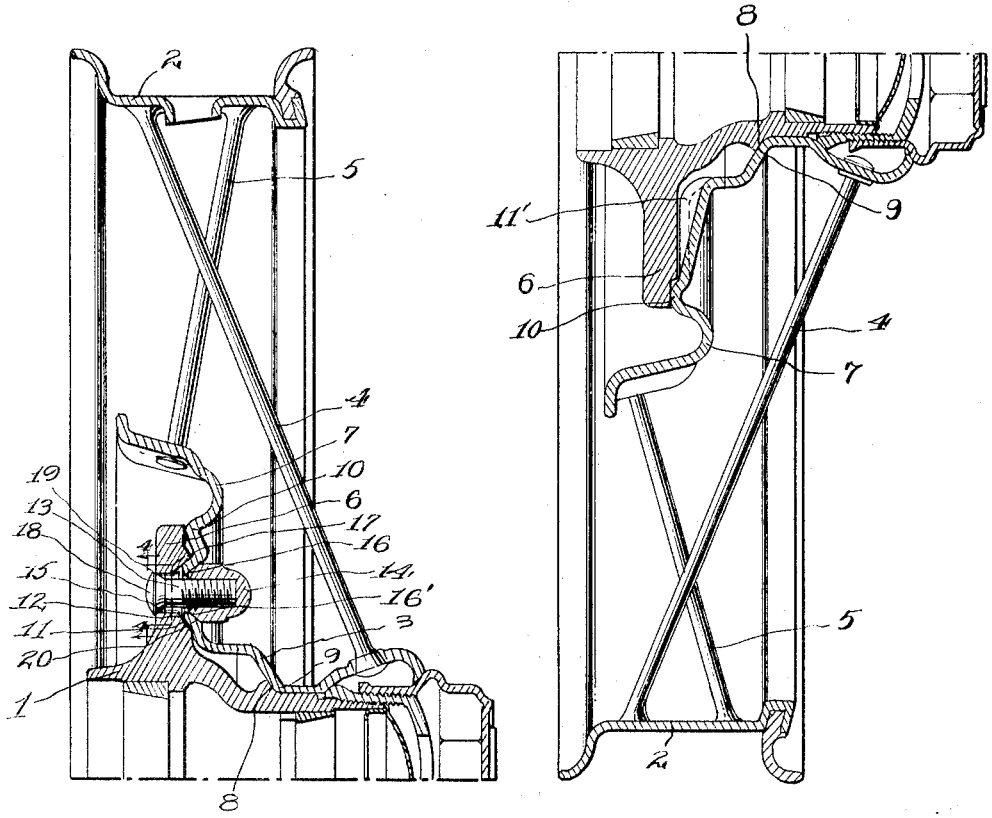
Figure 1:
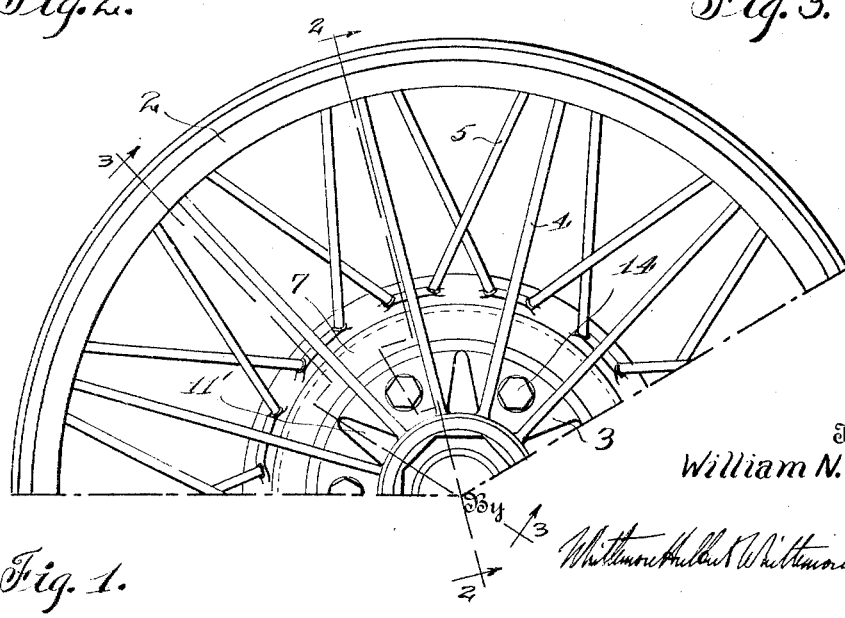

The vehicle wheel, as shown in Figures 1, 2, 3 and 4, has the hub 1 and the tire carrying rim 2, the hub shell 3 and the front and rear sets of spokes 4 and 5, respectively, connecting the rim and hub and with the same forming a wheel body which is mounted upon the hub. The hub 1 has the fixed radial flange 6, which, as shown, is integral therewith and the hub shell is preferably formed of sheet metal and has the radial flange 7 which is adapted to extend at the front side of the radial flange 6. The hub and hub shell have the cooperating tapered annular shoulders 8 and 9 respectively upon their barrels and adapted to contact to limit the rearward movement of the hub shell relative to the hub while placing the wheel body upon the hub. The radial flange 7 has the annular rib 10 which is adapted to contact with the front face of the radial flange 8 near its outer edge and the tapered annular or frusto-conical driving projections 11 with their outer faces adapted to engage correspondingly inclined walls of the recesses 12 in the front face of the radial flange 6. The radial flange 7 also preferably has the radially extending hollow reinforcing ribs 11' which are located between the tapered annular projections 11 and preferably pressed into the radial flange. The tapered annular projections 11 are normally so located with respect to the annular rib 10 that they come into contact with the walls of the recesses 12 after the annular rib has come into contact with the radial flange 6 and as a result these tapered annular projections resiliently react upon the nuts to lock the same upon their respective bolts. The annular rib 10 is normally so located with respect to the annular shoulder 9 that when this shoulder comes into contact with the annular shoulder 8 the annular rib is spaced from the radial flange 6 and as a consequence the tightening up of the nuts upon the bolts compels the radial flange 7 to flex in bringing the annular rib into contact with its radial flange thereby either tensioning the front and rear sets of spoken 4 and 5 if they are not under tension or increasing their tension if they are already under tension in the wheel body before it is assembled upon the hub. In the present instance it is preferred to have the spokes under tension in the wheel body before assembling, to the hub so that the securing of the wheel body to the hub increases the spoke tension.

For securing the wheel body to the hub, I have provided the bolts 13 and nuts 14, the bolts freely extending through transverse openings 15 in the radial flange 6 and also through the tapered annular projections 11, the openings providing clearance around the bolts. The recesses 12 are at the front ends of these openings. The bolts are provided with the fins 16 extending longitudinally thereof and within the channels 17 formed in the radial flange 6 and extending longitudinally of and opening into the transverse openings 15, the arrangement being such that the bolts while free to move angularly to a limited extent are nevertheless held from rotation relative to the radial flange 6. The inner ends of these fins are also preferably struck up at 16' to form shoulders cooperating with the radial flange 6 in holding the bolts from disengagement from this radial flange. The inner ends of the bolts are provided with the heads 18 which have tapered annular contact faces 19 for engaging correspondingly inclined faces in the rear face of the radial flange 6 and at the rear end of the openings 15. The nuts 14 are threaded upon the front ends of the bolts 13 and have tapered annular contact faces 20 which are inclined to fit the inner faces of the tapered annular projections 11. Furthermore, the rear ends of these nuts preferably extend rearwardly beyond the front face of the portion of the radial flange 6 surrounding the tapered annular projections when the nuts have been tightened down upon the bolts. With the arrangement as described, it will be seen that the hub shell is driven with the hub without subjecting the bolts to shearing stress and the bolts are free to move angularly so that the tapered contact faces of the bolts and nuts may find their proper seats. Furthermore, the bolts are held from rotation in the radial flange of the hub so that the nuts may be readily tightened thereupon. It will also be seen that the nuts are held from disengagement from the bolts by reason of the tapered annular projections 11 exerting a resilient pressure thereupon in tending to resume their normal positions. Another decided advantage resides in the flexing of the radial flange 7 of the hub shell while securing the wheel body upon the hub since by reason of this flexing the tension upon both the front and rear sets of spokes may be increased.

In the modification shown in Figures 5 and 6, the parts have the same general arrangement but a brake drum 21 is added. This brake drum is preferably rigidly secured to the radial flange 22 upon the hub 23 by means of the bolts 24 and nuts 25 which are located at points between the bolts 26 and nuts 27 for securing the hub shell to the hub. The bolts 24 have fins 28 for engaging in channels 29 formed in the radial flange 22 to hold these bolts from rotation. These bolts also have the heads 30 with tapered annular faces for engaging corresponding faces in the front side of the radial flange, the nuts being located at the rear side of the web 31 of the brake drum. The bolts 26 have their heads 32 formed with tapered annular contact faces 33 for engaging corresponding faces formed in the rear side of the web 31, the bolts extending freely through this web and being held from rotation relative to the radial flange in the same manner as the bolts 13.

Figure 7 shows another modification of vehicle wheel which differs mainly from those shown in the other Figures in that the wheel body instead of being designed to be demountable from the wheel hub, is designed to be permanently secured thereto and has a felly at the outer ends of the spokes upon which is mounted a demountable tire carrying rim. The bolts 34 and nuts 35 for securing the wheel body to the hub are reversed end for end so that the nuts are at the rear side of the radial flange 36 fixed upon the hub 37 and the heads 38 of the bolts are at the front side of the radial flange 39 of the hub shell 40 forming part of the wheel body. The heads of the bolts have tapered annular contact faces 41 for engaging the inner sides of the tapered annular projections 42 upon the radial flange 39, while the nuts have tapered annular contact faces 43 for engaging corresponding faces formed in the rear side of the radial flange 36. To hold the bolts from rotation while turning the nuts, the bolts are provided with the diametrically opposite radial fins 44 adjacent their heads and engaging in corresponding channels formed in the edges of the tapered annular projections 42. These tapered annular projections are also positioned so that they will function to lock the nuts upon the bolts by reason of resiliently acting upon the heads of the bolts.

What I claim as my invention is:

1. In a vehicle wheel, the combination of a hub member having a radial flange, a wheel body member having a resilient radially extending portion, said radial flange having a recess and said radially extending portion having a tapered driving projection for engaging in said recess, said radially extending portion tending to resiliently hold said annular projection from contact with the wall of said recess, and means for securing said wheel body member to said hub member, including a bolt extending freely through said radial flange and radially extending portion and having free angular movement relative thereto, and a nut upon said bolt providing an inclined contact face engaging said projection and forcing the same into contact with the wall of said recess.

2. In a vehicle wheel, the combination of a hub member having a barrel and a radial flange formed with a recess in its front face, a wheel body member having a barrel and a resilient radially extending portion having a contact face engageable with said radial flange, a driving flange upon said radially extending portion located inwardly of said face engageable with said radial flange and engageable in said recess, means for securing said wheel body member to said hub member including a bolt extending through said radial flange and radially extending portion and having free angular movement relative thereto and a nut upon said bolt having a contact face engaging said flange and forcing the same into contact with the wall of said recess, and shoulders upon said barrels for limiting the rearward movement of said wheel body member relative to said hub member, said shoulders, contact face of said radially extending portion, and radial flange, and flange and wall of said recess being relatively positioned to successively contact.

3. In a vehicle wheel, the combination of a hub member, a wheel body member, and means for securing said hub and wheel body members to each other, including cooperating threaded members, one of said threaded members extending freely through and having free angular movement relative to said hub and wheel body members and having a fin engaging said hub member to hold said threaded member from rotation, said fin being struck up to form a shoulder engageable with said hub member to hold said threaded member from longitudinal disengagement from said hub member.

4. In a vehicle wheel, the combination of a hub member, a wheel body member having a resilient portion, and means for securing said hub and wheel body members to each other, including cooperating threaded members, one of said threaded members extending freely through said hub member and resilient portion and having free angular movement relative thereto and each of said threaded members having an inclined contact face, the face of one of said threaded members engaging a cooperating face on one of said hub and wheel body members and the face of the other of said threaded members engaging a cooperating face on the other of said hub and wheel body members, said resilient portion tending to resiliently force said cooperating threaded members away from each other.

5. In a vehicle wheel, the combination with a hub member and a wheel body member adapted to be detachably secured to said hub member and having a metal member adapted to extend adjacent to said hub member, said metal member and hub member having cooperating inter-engaging driving portions, said metal member being resilient and arranged so that the driving portions thereof are normally out of contact with the driving portions of said hub member, of means for detachably securing said metal member to said hub member comprising a bolt provided with a head having a tapered contact face for engaging one of said hub members and a nut threaded upon said bolt and having a tapered contact face engaging the other of said members, said bolt extending freely through said members and having free angular movement relative thereto.

6. In a vehicle wheel, the combination of a hub member having a radially outwardly extending flange, a plurality of angularly movable bolts loosely mounted in said flange to permit said angular movement relative thereto and secured against axial displacement, a wheel body member adapted to be secured to said flange, inter-engaging means upon said wheel body member and hub member to positively center said wheel body member on said hub member, said wheel body member being provided with a plurality of holes to freely receive said bolts, and nuts threaded upon said bolts and securing said wheel body member to said hub member.

In testimony whereof I affix my signature.

WILLIAM N. BOOTH.